No. 685,111. Patented Oct. 22, 1901.
F. M. DANNELLY.
SUCTION COTTON HARVESTING AND CLEANING APPARATUS.
(Application filed Jan. 24, 1901.)
(No Model.) 3 Sheets—Sheet 2.
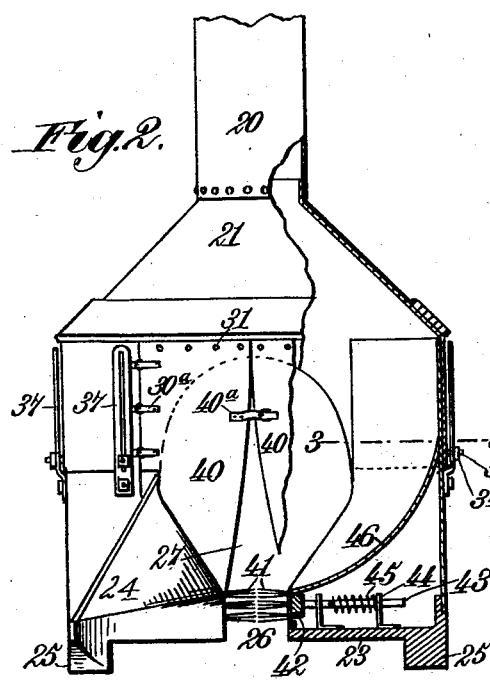

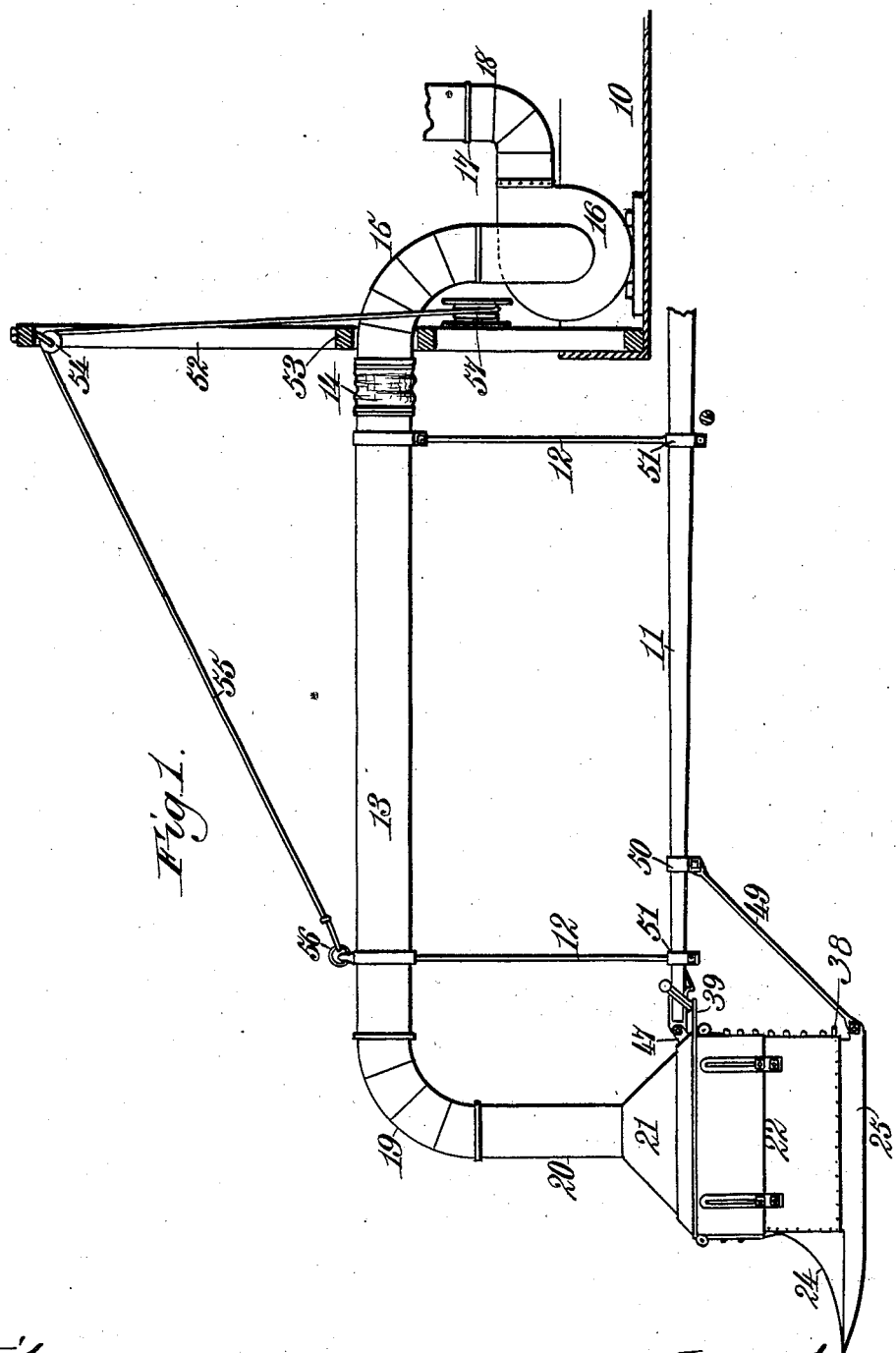

No. 685,111. Patented Oct. 22, 1901.
F. M. DANNELLY.
SUCTION COTTON HARVESTING AND CLEANING APPARATUS.
(Application filed Jan. 24, 1901.)
(No Model.) 3 Sheets—Sheet 3.
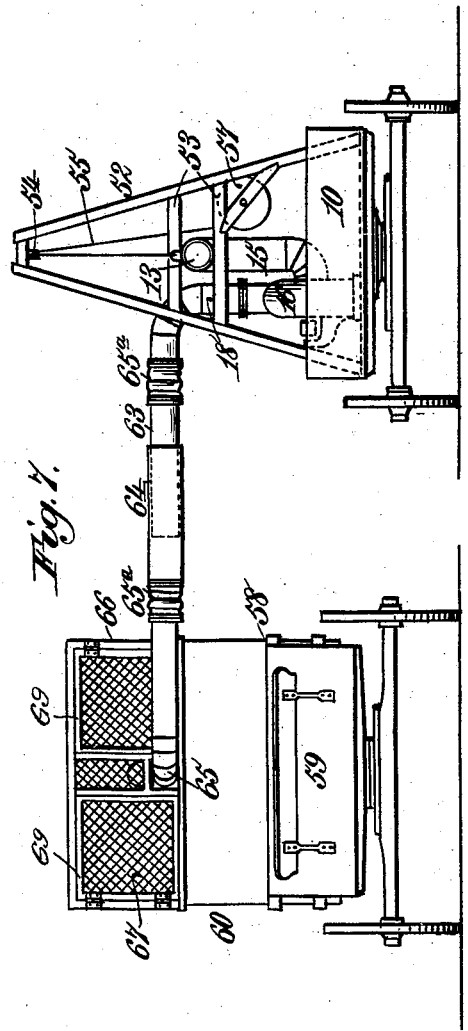
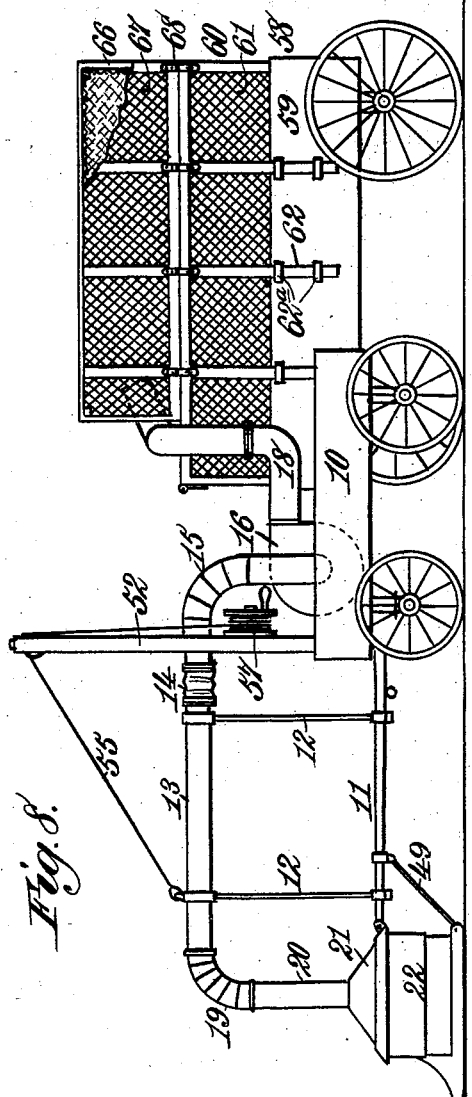
Witnesses.
Inventor,
Frank M. Dannelly,
By James L. Norris.
Atty.

UNITED STATES PATENT OFFICE.

FRANK M. DANNELLY, OF DALLAS, TEXAS.

SUCTION COTTON HARVESTING AND CLEANING APPARATUS.

SPECIFICATION forming part of Letters Patent No. 685,111, dated October 22, 1901.

Application filed January 24, 1901. Serial No. 44,625. (No model.)

*To all whom it may concern:*

Be it known that I, FRANK M. DANNELLY, a citizen of the United States, residing at Dallas, in the county of Dallas and State of Texas, have invented new and useful Improvements in Suction Cotton Harvesting and Cleaning Apparatus, of which the following is a specification.

This invention relates to a suction cotton harvesting and cleaning apparatus for harvesting cotton, and has for its principal object to effect an economical separation of the cotton from the ripe boll or growing plant by subjecting the same to the force of suction in such manner that neither the plants nor the unripe bolls will be injured or broken, while the cotton fiber that is thus removed from the ripe bolls will be delivered or collected in a clean condition without admixture with leaves or other foreign substances and in readiness for ginning.

It has for its further object to combine with such a cotton-picking machine a wheeled receptacle for the picked cotton so constructed that when the cotton is delivered into said receptacle by the cotton-picking machine the dust and dirt and other extraneous matter will be effectively removed from the cotton.

To these ends my invention consists in the features and in the construction, combination, and arrangement of parts hereinafter described, and particularly pointed out in the claims following the description, reference being had to the accompanying drawings, forming part of this specification, wherein—

Figure 1 is a view in side elevation of my improved suction cotton-picking apparatus as applied to and carried by the tongue of a wagon, one end of the suction apparatus being mounted in said wagon, which serves as a carrier for the suction-fan and its motor. Fig. 2 is a front elevation of a hooded suction-chamber with one side in vertical transverse section. Fig. 3 is a horizontal section of one side of the same on the line 3 3 of Fig. 2. Fig. 4 is a rear elevation of the suction-chamber and its closure. Fig. 5 is a plan of the suction-chamber with the top or hood removed. Fig. 6 is a part end elevation of one side of the suction-chamber in section on the line 6 6 of Fig. 5. Fig. 7 is a view in front elevation of the wagon carrying the cotton-picking apparatus and of the cotton-receiving vehicle which is adapted to receive the cotton from the cotton-picking apparatus and separate the same from dirt and the like. Fig. 8 is a view in side elevation of the parts shown in Fig. 7.

In Fig. 1 of the drawings the reference-numeral 10 indicates a portion of a wagon-body, and 11 denotes the wagon-tongue. As shown, the wagon-tongue may be provided at suitable points with standards 12, projecting upward and supporting above said tongue a suction-pipe 13, one end of which is connected by a flexible joint 14 with the inlet-pipe 15 of a suction-fan 16, mounted in the wagon. In practice the construction is such that the cotton is directed from the suction-pipe into the exhaust or discharge pipe without passing through the blades of the fan. The fan may be driven by any suitable motor, (not shown,) the specific construction of the fan and motor forming no part of this invention. Connected with the exhaust or outlet of the fan is a vertical discharge-pipe 18, curved laterally to one side at its upper end, as most clearly shown in Fig. 7 of the drawings. The pipe 18 is provided with a swiveled or loose joint 17, whereby its upper portion may be laterally swung toward either side of the harvester-wagon for depositing the harvested cotton into another wagon or wheeled receptacle arranged to receive it. The inlet or outer end portion 19 of the suction-pipe 13 is curved downward to connect with a pipe-section 20, having its lower end secured around a flanged opening in the conical top portion of the hood 21, which constitutes the cover of the vacuum-chamber 22, which, together with its said hood, is so constructed as to straddle a row of cotton-plants.

With reference to the preferred construction and arrangement of the several parts of the straddling suction-chamber 22 it may be said that this chamber has a longitudinally-divided base portion 23, Fig. 2, from each side of which at its front end portion there projects a forwardly-extending moldboard 24, Figs. 1, 2, and 5. The acting surfaces of the two moldboards are slanted upward, inward, and rearward from the diverging and approximately pointed front ends of the moldboards, and the said surfaces of both moldboards are so beveled, rounded, or curved and so disposed with relation to each other and to the inlet of the suction-chamber as to direct or guide the limbs of the plant-stalks into the stalk-inlet without bruising or otherwise injuring any part of the plant. The suction-chamber 22, with its base 23 and moldboards 24, may be supported on runners or shoes 25, which are curved upwardly at their front ends to slide easily on the ground. Obviously instead of employing runners the suction-chamber and connected moldboards may be mounted on wheels or casters, and the lowermost or main body portion of the suction-chamber 22 may have its outer walls rectangular, or the walls of said chamber may be of any desired configuration suited to the purposes of the invention.

In the bottom of the suction-chamber 22, between the two opposite side portions of its base 23, there is a longitudinal slot 26 for the passage of the plant-stalks as the straddling suction-chamber is carried along over a row of cotton-plants. This slot 26 may be termed the "lower" and "horizontal" stalk-inlet. At its front end it is continuous with an enlarged vertical stalk-inlet 27, Fig. 2, that is formed in the front wall of the suction-chamber. The shape of this vertical inlet 27 is preferably rounded or oval to facilitate entrance of the branches or limbs of the cotton-plants. The rear end of the lower or horizontal stalk-inlet 26 is continuous with a vertical outlet 28, formed in the rear wall of the suction-chamber, for exit of the stalk limbs and branches. This outlet 28 may have substantially the same shape and dimensions as the vertically-arranged inlet 27, so as to facilitate exit of the stalk limbs and branches after the cotton has been removed from the ripe bolls.

The vertical stalk-inlet 27 and the vertical outlet 28 each have their upper portions extended part way into the hood 21, which telescopes over the open top portion of the main vertical walls of the suction-chamber. The outlet 28 in the rear wall of the suction-chamber 22 is provided with a central and vertically-divided curtain 29, which is secured at its vertical outer edges to the outer side of said wall on the opposite sides of said vertical stalk-outlet. The curtain may be conveniently secured at its vertical edges to said wall by straps and buckles 30 in manner similar to a carriage-curtain and at its lower edge is fastened to buttons 32 on the under side of projecting plates 38, hereinafter described. At its upper edge the curtain is wound about a roller 33, journaled in suitable bearings on the hood 21 for the purpose hereinafter explained. The hood 21 may be secured at any desired vertical adjustment by means of nuts 34 on screw bolts or studs 35, projecting from the outer sides of the hood 21, said screw-bolts being extended through vertical slots 36 in standards 37, which are bolted or otherwise secured at their lower ends to the outer sides of the body portion of the suction-chamber. These standards 37 may be arranged at convenient intervals, and for the greater part of their length they are offset, as shown in Fig. 2, for the purpose of permitting the hood 21 to fit within the inner sides of said standards. The curtain 29 is divided centrally and vertically, as described, to permit easy exit of the plant-stalks as the suction apparatus is moved forward. When the hood is raised to accommodate the apparatus to larger or longer stalks or plants, the curtain will unwind or unroll from the roller 33 and close the upper part of the stalk-aperture, thus automatically accommodating itself to the adjustment of the hood. The roller 33 may conveniently be a spring-roller constructed in manner similar to the well-known window-curtain roller. Fixed to the rear wall of the suction-chamber on each side of the lower end of the stalk-outlet is a rearwardly-projecting shelf or plate 38, and arranged above the stalk-exit is a plate or shelf 39, Figs. 1 and 4, which extends across the rear of the suction-chamber. The plates 38 and 39 serve to a certain extent to prevent the passage of air at the points where said plates are located when the curtain swings open. As shown in Fig. 5, the front of the suction-chamber 22 is curved inwardly on both sides of the stalk-inlet 27 in such manner as to present rounded surfaces, which will not injure the branches or limbs of the cotton-plants as they enter the suction-chamber. Suspended from the vertical stalk-inlet 27 is a sheet or curtain 40 of flexible material, such as rubber, cloth, duck, or the like, having a central vertical slit which will permit the curtain to yield inwardly at that point for passage of the plants without subjecting them to any injury. Obviously its purpose is to obstruct the passage of air at the stalk-inlet. The curtain 40 is fastened at its upper end to buttons 31 on the hood 21 and at its sides is secured by straps and buckles 30ª in similar manner to the curtain 29, before described. The curtain at its lower end is disposed behind the moldboards 24 and is secured thereto by straps and buckles. (Not shown.) A strap 40ª is provided, by means of which the adjacent edges of the curtain may be secured together. In harvesting low cotton this strap will be fastened, but when the plants are high the strap will be unfastened to leave the edges of the curtain free.

In the horizontal stalk-inlet 26 at the bottom of the suction-chamber there is placed on each side of said inlet a row of brushes 41, Figs. 2 and 5, which are intended to serve as guards for preventing leaves, dirt, and the like from being sucked up from the ground and into the suction-chamber. These guard-brushes 41 may consist of bristles or other suitable material arranged in groups and fastened to blocks 42, Fig. 2, each block being secured to the forward or outer end of the rod 43, mounted to slide in brackets 44 on the base 23 of the suction-chamber. Each rod or stem 43 is provided with a spring 45, Fig. 2, arranged to normally press the brush outwardly into the horizontal stalk-inlet. It will be understood, of course, that as the suction apparatus is carried forwardly along and over a row of plants the series of guard-brushes on both sides of this stalk-inlet will successively yield to permit the passage of the stalks, while at the same time the brushes will serve to prevent dirt and leaves from being sucked up into the suction-chamber, and this is accomplished without subjecting the plants to any injury. Within the suction-chamber 22 there is a curved bottom 46, which slopes up gradually from the stalk-inlet 26 from a point immediately above the guard-brushes 41 and which is extended about half-way up the outer walls of the suction-chamber. This bottom 46 serves as a guard to prevent deposit of any material on the base 23 of the suction-chamber and at the same time presents curved surfaces which will not subject the limbs or branches of the plants to any injury during the progress of the machine. The curved bottom 46 also serves as a guide for directing the limbs of the stalks to the stalk-outlet 26 after the bolls have been freed from their cotton by the operation of suction.

By reference to Figs. 1 and 4 it will be observed that the rear upper portion of the suction-chamber hood 21 is provided with a pair of lugs 47 for the passage of a transversely-arranged bolt or pivot 48, through which the suction-chamber is connected with the forward end of the wagon-tongue 11 with sufficient flexibility to permit the vertical adjustment of said hood to accord with the heighth of a row of plants. The lower portion of the suction-chamber 22 is braced by means of rods 49, Fig. 1, extended upwardly from the rear ends of the shoes or runners 25 and converging beneath the wagon-tongue 11, to which they are connected by means of a suitable strap 50 or otherwise. This strap 50 may be connected with the wagon-tongue in such manner as to have a slight sliding movement thereon when the hood of the suction-chamber is adjusted, and similar connections 51 may be provided for the lower ends of the standards 12, which support the suction-pipe 13, through which the suction-chamber and the exhaust-fan 16 are put in communication with each other.

On the wagon body or bed 10 there is mounted a derrick-frame 52, Fig. 1, which is provided with braces 53, which may assist in affording a support for the inlet-pipe 15 of the exhaust-fan. To an upper part of the derrick-frame 52 there is attached a pulley 54 for a rope or cable 55, one end of which is attached to a ring or staple 56 on the suction-pipe 13, while the other end of said rope or cable is attached to a small windlass 57. By means of this windlass the suction-pipe 13 and the connected hood 21 of the suction-chamber may be raised or lowered, as desired, the nuts 34, which secure said hood, having first been loosened. By this means the hood may not only be vertically adjusted, but the suction-machine can be raised from the ground when driven from one field to another or during transportation and may also be raised from the ground when turning at the ends of the rows. The flexible joint 14 in the rear portion of the suction-pipe 13 will readily permit the said suction-pipe to be raised or lowered, as may be desired, and the loose connections 50 and 51 on the wagon-tongue 11 will not obstruct any required movement of the standards 12 and brace-rods 49 to accord with the adjustment given to the hood of the suction-chamber. The various parts of the suction apparatus are preferably made from sheet-iron well braced with iron frames; but wood or other suitable material may be employed in the construction. It is preferable to carry the suction-chamber in front of the wagon by attaching it to the wagon-tongue, as described, thereby enabling cotton to be picked before the wagon or other vehicle passes over the stalks. However, this position may be reversed, so as to provide for carrying the suction-chamber behind the wagon, if desired. The flexible curtains at the front and rear of the suction-chamber permit the easy entrance and exit of the plants and stalks, and it is one of the objects of my invention to prevent bruising, tearing, or breaking off of the plants and their limbs as much as possible, and to this end I provide wherever practicable rounded, curved, or beveled surfaces at all points in the suction-chamber and at its inlets and outlets wherever the plant would be exposed to injurious pressure. The operation of the cotton-picking machine as above described will be readily understood. The height of the suction-chamber having been adjusted by elevating or lowering its hood 21, so as to accord with the height of a row of plants, the machine is carried forward along and over a row of plants and the suction-fan 16 is put into operation. The suction or exhaust exerted by this fan will readily separate and remove the cotton fiber from the ripened bolls and will rapidly draw the same upward into the suction-chamber 13 and discharge the cotton fiber through the exhaust-pipe into a wagon-body, as will more fully hereinafter appear. The guard-brushes 41, normally projecting across the horizontal stalk-inlet 26, will prevent leaves and other undesirable matter from being sucked up from the ground, and by reason of their flexibility and capability of yielding for the passage of the plant-stalk these guard-brushes will not subject the plants to any injury. The suction apparatus described is adapted to pick cotton with great rapidity and deliver it into a wagon or similar receptacle constructed in the manner which I will now describe.

Referring to Figs. 7 and 8, the numeral 58 indicates a wagon or other suitable wheeled receptacle which is adapted to be driven alongside the wagon carrying the fan and motor, and the numeral 59 indicates the bed or body of the wagon 58. Mounted on the top of the wagon bed or body is a frame 60, covered on all sides by screens or wire-netting 61. The frame 60 may be conveniently secured to the wagon-bed by means of standards 62, which are attached to the frame and project below the latter, the lower ends of said standards fitting in sockets 62$^a$, fixed to the sides of the wagon-bed. Removably fitted on top of the frame 60 is what I term a "condenser and cleaner," consisting of a rectangular frame 66, covered on all sides and top with wire-netting or screens 67. The frame 66 is detachably secured to the frame 60 by hasps and staples 68 of ordinary and well-known construction. When the wagon-frame 60 is filled with cotton, the condenser and cleaner can be removed and placed upon another wagon provided with a frame 60 to be used while the loaded wagon is being driven to the gin and unloaded. In the front end of the condenser and cleaner are arranged doors 69 to afford access thereto when necessary. Arranged to convey the cotton from the exhaust-pipe 18 to the wagon 58 is a conveyer-pipe consisting of two telescopic sections 63 and 64, adapted to freely slide one within the other, the section 64 being provided with an elbow 65, which projects into the condenser on top of the wagon-frame and is directed at an angle toward the screen on the top of the same. Each of the sections 63 and 64 is made in two parts connected together by a flexible joint 65$^a$, as shown most clearly in Fig. 7. The section 63 is fitted to the end of the exhaust-pipe 18. The wagon 58 is driven by the side of the wagon carrying the fan and motor, preferably on that side from which the cotton has been picked, the telescopic sections and flexible joints of the conveyer-pipe compensating for any difference in speed at which the two wagons may be driven and for irregularities of the ground without causing any strain on the conveyer or exhaust pipes or their connections. The conveyer-pipe discharges the cotton against the under side of the top of the wire screen on the wagon 58, striking the screen at an angle. The screen prevents the cotton from being blown out and separates it from the air-current, the cotton falling into the wagon and the strong current escaping through the screen and carrying any loose dirt in the cotton with it.

What I claim as my invention is—

1. In a suction cotton-picking machine, a suction-chamber having in its bottom a horizontal longitudinally-extended stalk-inlet with a vertical inlet at its front end and a vertical outlet at its rear end and provided in its said horizontal inlet with horizontal yielding guard devices adapted to permit passage of the plant-stalks and prevent the sucking up of leaves from the ground and into said suction-chamber, an exhaust-fan, a suction-pipe leading from the suction-chamber to said fan, and a discharge-pipe connected to the fan, substantially as described.

2. In a suction cotton-picking machine, a suction-chamber having a horizontal longitudinally-extended stalk-inlet at the bottom, a vertically-extended inlet at one end and a vertically-extended stalk-outlet at the other end of said horizontal inlet, whereby the said chamber is adapted to straddle a row of growing plants, in combination with yielding guard devices for said horizontal inlet, and a yielding guard device for the stalk-outlet, substantially as described.

3. In a suction cotton-picking machine, a suction-chamber having a horizontal longitudinally-extended stalk-inlet at the bottom with vertical extensions at opposite ends for entrance and exit, respectively, of the stalks of growing plants, in combination with horizontal brushes for guarding the said horizontal inlet to prevent the sucking up of leaves into the said suction-chamber, substantially as described.

4. In a suction cotton-picking machine, a suction-chamber adapted to straddle a row of cotton-plants and having a horizontally-extended stalk-inlet in its bottom with a vertically-extended inlet at one end and a vertically-extended outlet at the other end, in combination with horizontal brushes for guarding the said horizontal inlet to prevent the sucking up of leaves, and a curved bottom in said suction-chamber sloping upward from said brushes to the outer walls of the suction-chamber to guide the limbs of the cotton-plants to the said outlet, substantially as described.

5. In a suction cotton-picking machine, the combination with a suction-chamber having inlet-passages in its bottom and front end and an outlet-passage in its rear end, of moldboards carried by the forward end of said chamber and projecting in front of the latter for guiding the limbs and branches of the plants to the inlet of said chamber, horizontal yielding guard devices for the inlet or passage in the bottom of said chamber, an exhaust-fan, a suction-pipe leading from the suction-chamber to said fan, and a discharge-pipe connected to the fan, substantially as described.

6. In a suction cotton-picking machine, the combination with a suction-chamber having a stalk-inlet in its bottom and in its front end, yielding brushes to guard the bottom inlet and prevent the sucking up of leaves into the suction-chamber, a stalk-outlet in the rear end of said chamber, a yielding guard device for said outlet, and moldboards carried by the forward ends of the suction-chamber to guide the limbs and branches of the cotton-plants to the inlet in the front of said chamber, substantially as described.

7. In a suction cotton-picking machine, the combination with a suction-chamber having a stalk inlet or passage in its bottom, of brushes located in said inlet and mounted on longitudinally-yielding stems, and springs for the stems of said brushes, substantially as described.

8. In a suction cotton-picking machine, the combination with a suction-chamber adapted to straddle a row of growing plants and having a longitudinal passage or inlet in its bottom, of horizontal yielding brushes to guard the said inlet in the bottom of said chamber, a curved or beveled bottom in said chamber to guide the limbs and branches of the plants while in said chamber, and moldboards carried by the front end of the chamber and projecting forward of the latter, substantially as described.

9. In a suction cotton-picking machine, the combination with a suction-chamber having an inlet in its front end, an outlet in its rear end and a horizontal longitudinally-extended inlet in its bottom, of a curtain for the outlet of said chamber, substantially as described.

10. In a suction cotton-picking machine, the combination with a suction-chamber having an open top and provided in its bottom and in its front and rear ends with passages for the stalks of growing plants, of a hood telescoping over the open top of the suction-chamber and adjustable vertically to accord with the height of a row of plants, substantially as described.

11. In a suction cotton-picking machine, the combination with a suction-chamber to straddle a row of growing plants and having its bottom and its front and rear ends provided with inlets and outlets for passage of the plant-stalks, of a hood telescoped over the open top of the main portion of said chamber, and a curtain for the outlet from said chamber, said curtain being centrally and vertically divided, substantially as described.

12. In a suction cotton-picking machine, the combination with a suction-chamber having a stalk-inlet in its bottom and in its front end and a stalk-outlet in its rear end, of a centrally and vertically divided curtain for the stalk-outlet, and shelves or plates above and below said curtain to obstruct the passage of air at those points, substantially as described.

13. In a suction cotton-picking machine, the combination with a suction-chamber adapted to straddle a row of growing plants and composed of a lower portion supported on runners or wheels and an upper portion or hood telescoped over the said lower portion and vertically adjustable thereon, of moldboards carried on the forward end of said suction-chamber to guide the limbs of a row of growing plants into said chamber as it is carried along over the plant-row, substantially as described.

14. In a suction cotton-picking machine, the combination with a wagon and its tongue, of a suction-chamber suspended from the forward end of said tongue and adapted to straddle a row of growing plants, a suction-fan mounted in the wagon, a suction-pipe having one end connected with the upper part of said suction-chamber and its other end connected with the inlet to said suction-fan, and an adjustable discharge-pipe connected with the exhaust of the fan to deliver cotton into a wagon, substantially as described.

15. In a suction cotton-picking machine, the combination with a farm-wagon, an exhaust-fan mounted in said wagon, a suction-chamber adapted to straddle a row of growing plants and provided with a vertically-adjustable upper portion or hood, of a suction-pipe having one end connected with the said upper portion or hood of the suction-chamber and its other end connected through a flexible joint with the fan-inlet, a derrick carried by the wagon and provided with a windlass and a sheave, and a cable passed over said sheave and connecting the windlass with said suction-pipe, whereby the suction-pipe and the vertically-adjustable hood or upper portion of the suction-chamber may be raised and lowered to accord with the height of a row of plants, substantially as described.

16. In a suction cotton-picking machine, the combination with a suction-chamber to straddle a row of growing plants and having its bottom and its front and rear ends provided with inlets and outlets for passage of the plant-stalks, of a hood telescoped over the open top of the main portion of said chamber, and a curtain for the outlet from said chamber, said curtain being centrally and vertically divided and attached at its outer vertical edge to the body portion of said chamber on each side of the stalk-outlet and adjustably connected at its upper end to the body portion of the chamber above said outlet, substantially as described.

17. In a suction cotton-picking machine, the combination with a suction-chamber to straddle a row of growing plants and having its bottom and its front and rear ends provided with inlets and outlets for passage of the plant-stalks, of a hood telescoped over the open top of the main portion of said chamber, a curtain-roller arranged above the stalk-outlet, a curtain wound on said roller and attached at its lower end below the stalk-outlet, said curtain being attached at its outer vertical edges to the body portions of said chamber on each side of the stalk-outlet, substantially as described.

18. In a suction cotton-picking machine, the combination with a wagon, of an exhaust-fan mounted in said wagon, a suction-chamber suspended from the forward end of the wagon-tongue and adapted to straddle a row of growing plants, a suction-pipe supported by the wagon-tongue and having one end connected with the upper portion of the suction-chamber and its other end connected through a flexible joint with the fan-inlet, a second wagon for the reception of the cotton, provided with a screen cover, and means for conveying the picked cotton from the suction-pipe to the interior of said screen cover, substantially as described.

19. In a suction cotton-picking machine, the combination with a wagon, of an exhaust-fan mounted in said wagon, a suction-chamber suspended from the forward end of the wagon-tongue and adapted to straddle a row of growing plants, a suction-pipe supported by the wagon-tongue and having one end connected with the said suction-chamber and its other end connected through a flexible joint with the fan, a second wagon for the reception of the cotton, provided with a screen cover, and a telescopic conveyer extending from the exhaust-pipe to the interior of the screen cover, substantially as described.

20. In a suction cotton-picking machine, the combination with a wagon, of an exhaust-fan mounted in said wagon, a suction-chamber suspended from the forward end of the wagon-tongue and adapted to straddle a row of growing plants, a suction-pipe suspended by the wagon-tongue and having one end connected with the said suction-chamber and its other end connected through a flexible joint with the fan, a second wagon for the reception of the cotton, provided with a screen cover, and a telescopic conveyer-pipe each section of which comprises two parts connected by flexible joints, said conveyer-pipe extending into the interior of the screen cover, substantially as described.

21. In a suction cotton-picking machine, the combination with a suction-chamber having an inlet in its front end and an outlet in its rear end, and a horizontal longitudinal extended inlet in its bottom, of a curtain for the inlet of said chamber, substantially as described.

In testimony whereof I have hereunto set my hand in presence of two subscribing witnesses.

FRANK M. DANNELLY.

Witnesses:
WILLIAM W. MANNING,
PERCY RODGERS.